United States Patent [19]

Nihei et al.

[11] Patent Number: 5,229,829
[45] Date of Patent: Jul. 20, 1993

[54] HEIGHT SENSOR AND AIR CUSHION

[75] Inventors: Norio Nihei; Masatoshi Ohishi, both of Kodaira; Makoto Nakao, Saitama, all of Japan

[73] Assignee: Bridgestone Corporation, Tokyo, Japan

[21] Appl. No.: 924,467

[22] Filed: Aug. 4, 1992

[30] Foreign Application Priority Data

Aug. 9, 1991 [JP] Japan .................................. 3-200453

[51] Int. Cl.$^5$ .............................................. G01C 3/08
[52] U.S. Cl. .......................................... 356/4; 280/707
[58] Field of Search ............................. 356/4; 280/707

[56] References Cited

U.S. PATENT DOCUMENTS

| 4,752,799 | 6/1988 | Stauffer | 356/4 |
| 4,798,369 | 1/1989 | Geno et al. | |
| 4,817,922 | 4/1989 | Hovance | 280/707 |
| 4,996,415 | 2/1991 | Tanaka et al. | |
| 5,056,913 | 10/1991 | Tanaka et al. | |

FOREIGN PATENT DOCUMENTS 62-232501 10/1987 Japan .
63-259403 10/1988 Japan .

Primary Examiner—Stephen C. Buczinski
Attorney, Agent, or Firm—Oliff & Berridge

[57] ABSTRACT

A height sensor comprises a pair of light-emitting elements disposed at positions spaced at different distances from a surface desired to be measured, the elements alternately emitting light rays, and a light-receiving element for receiving a light ray generated from each light-emitting element and reflected by the measured surface, the element producing a signal corresponding to the quantity of light received. The signal outputted from the light-receiving element is logarithmically converted by a logarithmic converter circuit. The output thereof thus has its direct current components removed by a filter. The value, covering from one peak to another peak, of the remaining alternating current components is equal to the value obtained by subtracting a logarithmically converted value of the signal outputted from the light-receiving element when causing one light-emitting element to give forth a light ray, from a logarithmically converted value of the signal outputted from the light-receiving element when causing the other light-emitting element to give forth a light ray. By rectifying this filter output, it is possible to detect the height up to the measured surface without being influenced by dirt on the measured surface upon the output of the light-receiving element.

10 Claims, 7 Drawing Sheets

HEIGHT SENSOR AND AIR CUSHION

BACKGROUND OF THE INVENTION

1. Field of the Invention

The present invention relates to a height sensor and an air cushion and, more particularly, to a height sensor such as a vehicle height sensor, which is intended to optically sense the height of an automobile or other vehicle, and to an air cushion which contains this height sensor.

2. Description of the Related Art

Recently, there has been an increasing number of vehicles, each of which is equipped with an air cushion in place of a conventional coil spring or leaf spring, in order to simultaneously improve both the comfort of ride and the operating performance in an automobile, which are reciprocal performances.

In the above-mentioned type of vehicle equipped with an air cushion, a vehicle height sensor is mounted inside a suspension system or air cushion so that the height of the vehicle can always be kept constant in accordance with the detected vehicle-height value of the vehicle height sensor. This makes it possible to maintain a constant attitude of the vehicle at all times irrespective of the number of passengers or the amount of load, thereby enhancing both the comfort of ride and operating performance.

The sensor used for controlling the vehicle height mainly includes an optical encoder type sensor or a magnetic encoder type sensor, each of which can be mounted between the vehicle body and a lower spring member of the suspension system. In this way, the sensors are put to practical use. In addition, a magnetic encoder type sensor contained inside the air cushion is also used.

In large-sized vehicles such as a truck, a bus, or the like, a mechanical control valve, which is constructed in such a manner as to detect variations in vehicle height by using a mechanical link and thereby enabling the supply and discharge of the air in the air cushion in accordance with the vehicle height, is mainly used.

The most sensors which have been put to practical use cannot be mounted inside the air cushion. Thus, they are equipped outside the same. For this reason, it is necessary to use a solid casing for guarding the sensor against stones, mud, or water kicked up from a road surface. Also, on account of being externally equipped, a number of steps are required for mounting of the sensor to the vehicle and for adjustment thereof.

In order to solve the above-mentioned problems, a magnetic type sensor, an ultrasonic type sensor, an optical reflection type sensor, etc. which are containable inside the air cushion have been proposed.

However, the magnetic type sensor imposes a limitation upon the stroke of the suspension because of the structure of an air cushion. On the other hand, the ultrasonic sensor has a problem in that the cost is high. Further, most of the optical reflection type sensors are indeed advantageous in that these drawbacks are small in number. However, another problem arises in that if a light reflection plate is dirty causing light reflectance to greatly vary, the measured results also vary. Thus, precision is not ensured.

In order to solve this problem, Japanese Patent Application Laid-Open No. 64-79685 discloses a method of measuring the distance to an object to be sensed in which the influence of the variation in reflectance is eliminated by causing emission of light rays from two kinds of light sources differring from each other in regard to the light emission area, causing reception of the light rays reflected from a reflection plate, separating these light rays from each other and comparing one of them with the other.

However, since this technology uses a plane light-emission element, the dimension of the light-emitting and light-receiving portions of the sensor become large. This raises various problems including limitation for a mountable air cushion, high cost, etc. And because of the peculiar characteristics of this technology, the distance corresponding to the suspension stroke would make accurate measurement difficult.

SUMMARY OF THE INVENTION

The present invention has been made in order to solve the above problems and an object thereof is to provide an inexpensive light-reflection type height sensor in which the output of a light-receiving element is not affected by being soiled or the like, and an air cushion which is equipped with this height sensor.

In order to achieve the above object, the first invention includes a pair of light-emitting elements disposed at positions spaced at different distances from a surface desired to be measured and alternately giving forth light rays, a light-receiving element for receiving the light rays generated from the light-emitting elements and reflected by the surface desired to be measured, to produce a signal corresponding to the quantity of light received, a logarithmic converter circuit for logarithmically converting the signal outputted from the light-receiving element, a filter for removing direct current components of an output from the logarithmic converter circuit, and a rectifier circuit for rectifying an output of the filter.

The second invention includes a reflection plate mounted to one of an upper-side spring member and a lower-side spring member, a pair of light-emitting elements mounted to the other of the upper-side spring member and the lower-side spring member at positions spaced at different distances from the reflection plate and alternately giving forth light rays, a light-receiving element mounted to the other of the upper-side spring member and the lower-side spring member for receiving the light rays generated from the light-emitting elements and reflected by the reflection plate to produce a signal corresponding to the quantity of light received, a logarithmic converter circuit for logarithmically converting a signal outputted from the light-receiving element, a filter for removing direct current components of an output from the logarithmic converter circuit, and a rectifier circuit for rectifying an output from the filter.

The third invention includes a pair of light-emitting elements disposed at positions spaced at different distances from a surface desired to be measured and alternately giving forth light rays, a light-receiving element for receiving the light rays generated from the light-emitting elements and reflected by the measured surface to produce a signal corresponding to the quantity of light received, a logarithmic converter circuit for logarithmically converting the signal outputted from the light-receiving element, a pair of holding circuits for holding the outputs from the logarithmic converter circuit in corresponding relation to the light rays from the pair of light-emitting elements, and a subtraction circuit for calculating the difference between the hold values which are held in the holding circuits.

The fourth invention includes a reflection plate mounted to one of an upper-side spring member and a lower-side spring member, a pair of light-emitting elements mounted to the other of the upper-side spring member and the lower-side spring member at positions spaced at different distances from the reflection plate and alternately giving forth light rays, a light-receiving element mounted to the other of the upper-side spring member and the lower-side spring member for receiving the light rays generated from the light-emitting elements and reflected by the reflection plate to produce a signal corresponding to the quantity of light received, a logarithmic converter circuit for logarithmically converting the signal outputted from the light-receiving element, a pair of holding circuits for holding the outputs from the logarithmic converter circuit in corresponding relation to the light rays from the pair of light-emitting elements, and a subtraction circuit for calculating the difference between the hold values which are held in the holding circuits.

Figure 1:
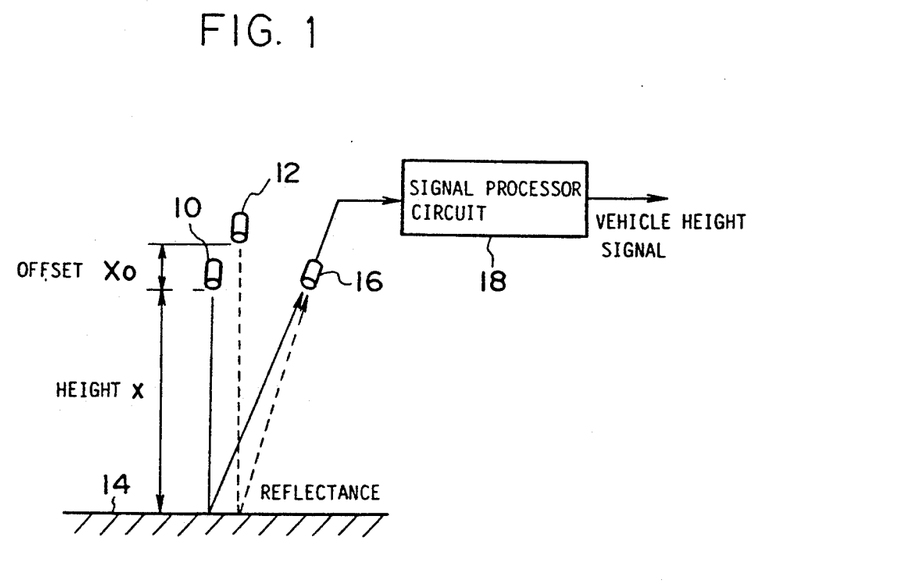
FIG. 1 is a schematic view for explaining the principle of the present invention.

The function of the present invention will hereinafter be described. As shown in FIG. 1, the height sensor of the present invention comprises a pair of light-emitting elements constituted by a first light-emitting element 10 and a second light-emitting element 12. The first light-emitting element 10 and the second light-emitting element 12 are disposed at positions spaced at different distances from a surface desired to be measured 14 and alternately give forth light rays. Assume now that the height from the first light-emitting element 10 to the surface desired to be measured 14 is represented by X, the distance between the first light-emitting element 10 and the second light-emitting element 12 is represented by Xo, the light or luminous intensity of the second light-emitting element 12 is represented by $C_2$ (see FIG. 2) and the reflectance of the measured surface 14 is represented by R. Then, the output E1 of a light-receiving element 16 when emitting light from the first light-emitting element 10 is represented by the expression (1) below. Also, the output E2 of the light-receiving element 16 when emitting light from the second light-emitting element 12 is represented by the expression (2) below.

$$E1 \propto \frac{R \cdot C_1}{X^2} \quad (1)$$

$$E2 \propto \frac{R \cdot C_2}{(X + X_o)^2} \quad (2)$$

When the ratio of E1 to E2 is determined, it is as shown in the expression (3) below. Thus, the output ratio E1/E2 ceases to be affected by the reflectance R of the measured surface 14.

$$E1/E2 \propto \frac{C_1}{C_2} \left(1 + \frac{X_o}{X}\right)^2 \quad (3)$$

Figure 2:
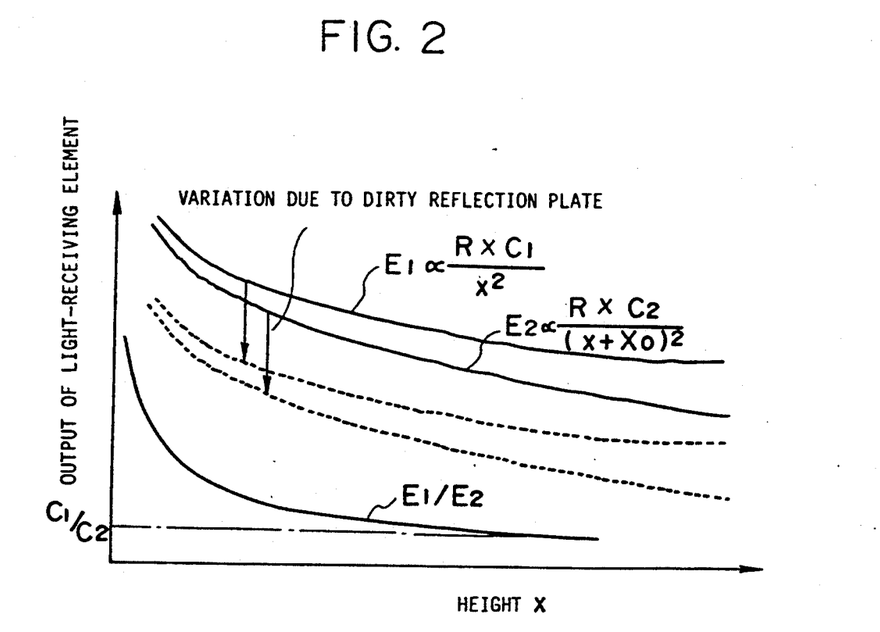
FIG. 2 is a line graph showing the relation between the output of a light-emitting element and the height.

Accordingly, even in a case where the reflectance R of the measured surface 14 is varied due to being dirty and each of the outputs E1 and E2 is decreased as shown in FIG. 2, it is possible to prevent the undesirable effects of dirt on the measured surface 14 by using the ratio of the output E1 to the output E2. In this view, in the present invention, a signal processor circuit 18 including a logarithmic converter circuit, a filter and a rectifier circuit is provided to cause alternate generation of light rays from the first light-emitting element 10 and the second light-emitting element 12, thereby causing logarithmic conversion, in the logarithmic converter circuit, of the signal outputted from the light-receiving element 16 receiving the light rays reflected by the measured surface 14 to generate a signal corresponding to the quantity of light received. The output of the logarithmic converter circuit has its direct current components removed by the filter, the direct current components being the signal components having a frequency lower than the light emission frequency signal of the light-emitting elements. The value from peak to peak, i.e., the peak-to-peak value of the remaining alternating current components corresponds to a value obtained by subtracting the logarithmically converted value of a signal outputted from the light-receiving element 16 when causing light emission of the second light-emitting element 12, from the logarithmically converted value of a signal outputted from the light-receiving element 16 when causing light emission of the first light-emitting element 10, corresponds to the ratio between the signal outputted from the light-receiving element 16 when causing light emission of the first light-emitting element 10 and the signal outputted from the light-receiving element 16 when causing light emission of the second light-emitting element 12. Accordingly, by rectifying the filter output, it is possible to obtain a signal corresponding to the height X from the first light-emitting element 10 to the measured surface 14.

According to the first invention, it is possible to detect the height without being influenced by dirt and also to simplify the construction of the signal processor circuit as well as the construction of each of the light-emitting elements and the light-receiving element. This makes it possible to realize a small-sized and inexpensive sensor.

The second air cushion is provided with a first height sensor. Namely, one of an upper-side spring member and a lower-side spring member of the air cushion is mounted thereto with a reflection plate whereas the other thereof is provided with a light-emitting element and a light-receiving element intended to receive the light ray generated from the light-emitting element and reflected from the reflection plate to produce a signal corresponding to the quantity of light received. As explained in the first invention, this light-emitting element is constituted by a pair of light-emitting elements which are mounted at positions spaced at different distances from the reflection plate and alternately give forth light rays. The signal which has been outputted from the light-receiving element is logarithmically converted by a logarithmic converter circuit and, after having its direct current components removed by the filter, is rectified by the rectifier circuit. According to the second invention, therefore, it is possible to provide an air cushion which is equipped with an inexpensive height sensor free from the effect of dirt.

In the third invention, the filter and the rectifier circuit used in the first invention are replaced with a pair of holding circuits for holding the logarithmic converter circuit outputs in corresponding relation to the light rays emitted from the pair of light-emitting elements and a subtraction circuit for performing arithmetic operation of the difference between the hold values held in the holding circuits. According to this third invention, the difference is determined between the values obtained by logarithmic conversion of the light-receiving element output through an operation of the holding circuits and the subtraction circuit as in case of the first invention. This enables the detection of the height involved with no effects attributable to dirt. At the same time, since it is possible to simplify the construction of the signal processor circuit as well as the construction of the light-emitting/light-receiving elements, it is possible to realize a small-sized inexpensive sensor.

The fourth invention is directed to an air cushion which is provided with a third height sensor. According to this fourth invention, it is possible to provide an air cushion of low cost which is equipped with a height sensor free from effects of dirt on the reflection plate or the like as in case of the second invention.

As has been explained above, according to the first and the third invention, it is possible to provide a height sensor which is capable of sensing the height at low cost free from the effect of dirt on the reflection surface or the like.

Further, according to the second and fourth inventions, it is possible to provide an air cushion which is equipped with a height sensor of low cost free from the effect of dirt on the reflection surface or the like. By using this air cushion with respect to a vehicle, the sensor is protected against stones, muds, water, etc. being kicked up from outside. This makes it possible to provide a highly reliable air cushion system.

DETAILED DESCRIPTION OF THE PREFERRED EMBODIMENTS

An embodiment of the present invention will now be described in detail with reference to the drawings. This embodiment is one in which a height sensor of the present invention is used as a vehicle height sensor and contained in an air cushion.

Figure 3:
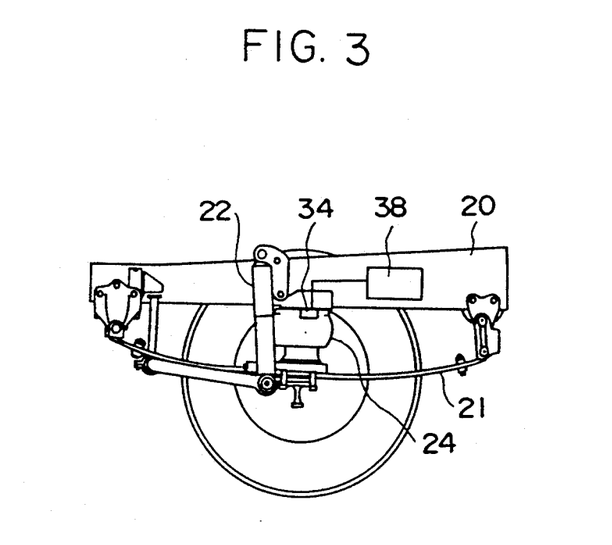
FIG. 3 is a schematic view showing a state in which an air cushion is mounted to a vehicle.

As shown in FIG. 3, an air cushion 24 is disposed between a vehicle body 20 and a leaf spring 21 on the vibration-receiving side. A shock absorber 22 is disposed near this air cushion 24. A vehicle-height sensor 34 is contained in the air cushion 24 and is connected to a control circuit 38 for controlling the vehicle height.

Figure 4:
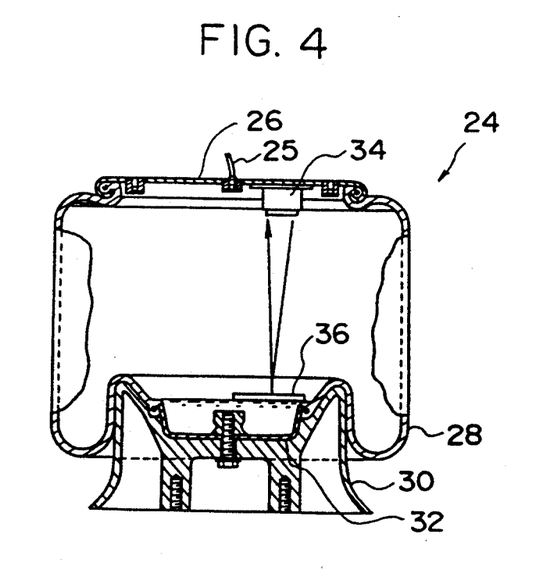
FIG. 4 is a sectional view of the air cushion.

As shown in FIG. 4, the air cushion 24 has a substantially cylindrical rubber sleeve 28, one end of which is caulked to the outer periphery of an end cap 26 constituting an upper spring member. A piston 30, which can enter into the rubber sleeve 28, is provided at the other end side of the rubber sleeve 28. This other end side of the rubber sleeve 28 is mounted to the piston 30 by a keeper metal fitting 32 constituting a lower-side spring member. Accordingly, a sealed off space is formed inside the rubber sleeve 28. The end cap 26 is provided with a duct 25 for controlling the air pressure inside the rubber sleeve 28. The duct 25 passes through the end cap 26. A vehicle height sensor 34 is mounted to the underside of the end cap 26. Inside the case of the sensor 34, a first light-emitting element, a second light-emitting element, a light-receiving element, a light emission control circuit and a light reception signal processor circuit are accommodated. A reflection plate 36 is provided at the position on the keeper metal fitting 32 which opposes the vehicle height sensor 34. As was explained in connection with FIG. 1, the first light-emitting element and the second light-emitting element are mounted at irregular positions which are spaced apart by different distances from the reflection plate 36. According to the present air cushion, it is possible to control the air pressure inside the air cushion on the basis of the vehicle height detected by the vehicle-height sensor 34, so as to enable the control of the vehicle height or spring constant. Note here in this connection that the respective mounting positions of the vehicle-height sensor 34 and reflection plate 36 may be reversed.

Figure 5:
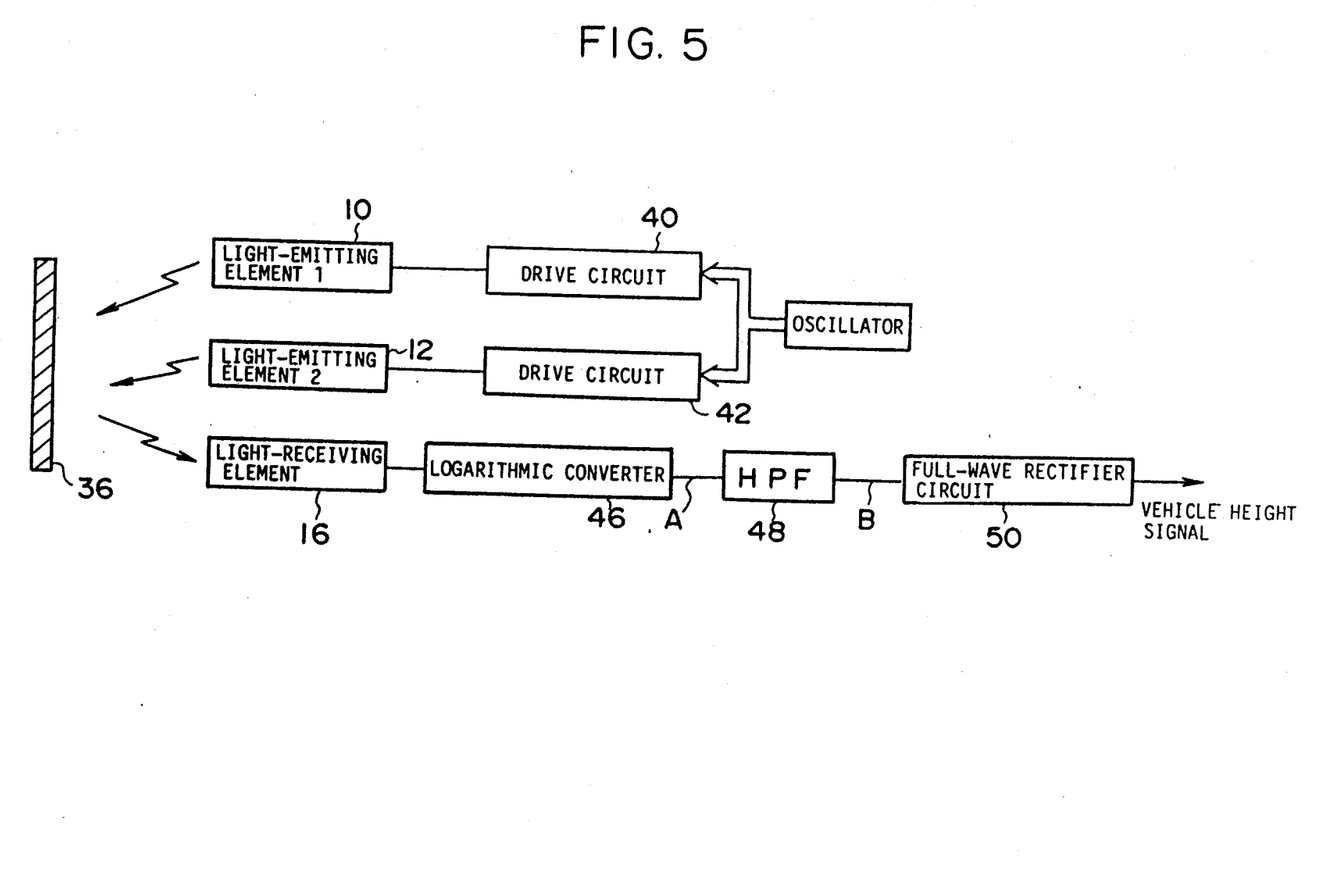
FIG. 5 is a block diagram of a height sensor according to a first embodiment of the invention.

As shown in FIG. 5, a drive circuit 40 and a drive circuit 42 are respectively connected to a first light-emitting element 10 and a second light-emitting element 12. An oscillator 44 which oscillates in response to a time-divisional drive frequency calculated from a cyclic measuring period required for the sensor is connected to each drive circuit 40 and 42. For this reason, the first light-emitting element 10 and the light-emitting element 12 are alternately caused, by the oscillator 44, to emit light in response to the time-divisional drive frequency signal via the drive circuits 40 and 42. The drive circuits 40, 42 and the oscillator 44 form a light emission controll circuit.

The light-receiving element 16 is connected to a full-wave rectifier circuit 50 via a logarithmic converter 46 and a high-pass filter 48 having a cut-off frequency lower than the time-divisional drive frequency of the oscillator 44. The logarithmic converter 46, the high-pass filter 48 and the full-wave rectifier circuit 50 form a light-receiving signal processor circuit.

Figure 6:
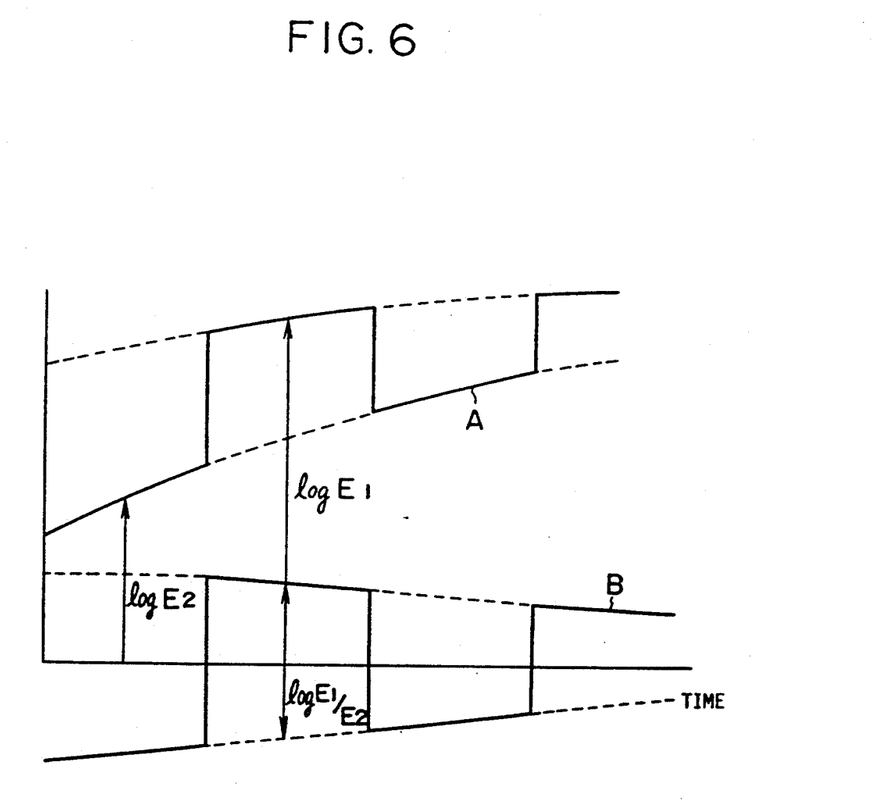
FIG. 6 is a linear diagram showing the waveforms involved in the portions shown in FIG. 5.

The operation of the present embodiment will now be explained. The oscillator 44 causes the first light-emitting element 10 and the second light-emitting element 12 to alternately emit light rays via their corresponding drive circuits 40 and 42. The light rays generated from the first light-emitting element 10 and the second light-emitting element 12 are reflected by the light reflection plate 36 and are received by the light-receiving element 16. The light-receiving element 16 produces a signal of a level corresponding to the quantity of light received. This signal is logarithmically converted by the logarithmic converter 46. A curve A in FIG. 6 indicates the waveform of an output from the logarithmic converter 46. E1 and E2 represent the outputs of the first light-emitting element 10 and the second light-emitting element 12. The output of the logarithmic converter 46 has direct current components, corresponding to the components of a frequency lower than the time-divisional drive frequency of the oscillator 44, removed therefrom by the high-pass filter 48, so that the resulting output has only an alternating current component as indicated by a curve B in FIG. 6. The value from peak to peak of the alternating current (twice as large as the amplitude) becomes the logarithm of a ratio E1/E2 where E1 represents the output of the first light-emitting element 10 and E2 the output of the second light-emitting element 12. The full-wave rectifier circuit 50 rectifies all of the output waves of the high-pass filter 48, thereby converting them to a direct current component. Accordingly, the output of this full-wave rectifier circuit 50 represents the height from the vehicle-height sensor 34 to the reflection plate 36, i.e., the height of the vehicle.

According to this embodiment, since the light-emitting control circuit and the light-receiving signal processor circuit have been constructed using an analog circuit in a simplified manner, these circuits can be incorporated integrally with the sensor. This enhances the maintainability and at the same time enables not only a reduction in the required space but also a reduction in the number of mounting steps. Note that the signal receiving processor circuit may be provided inside the control circuit 38.

Figure 7:
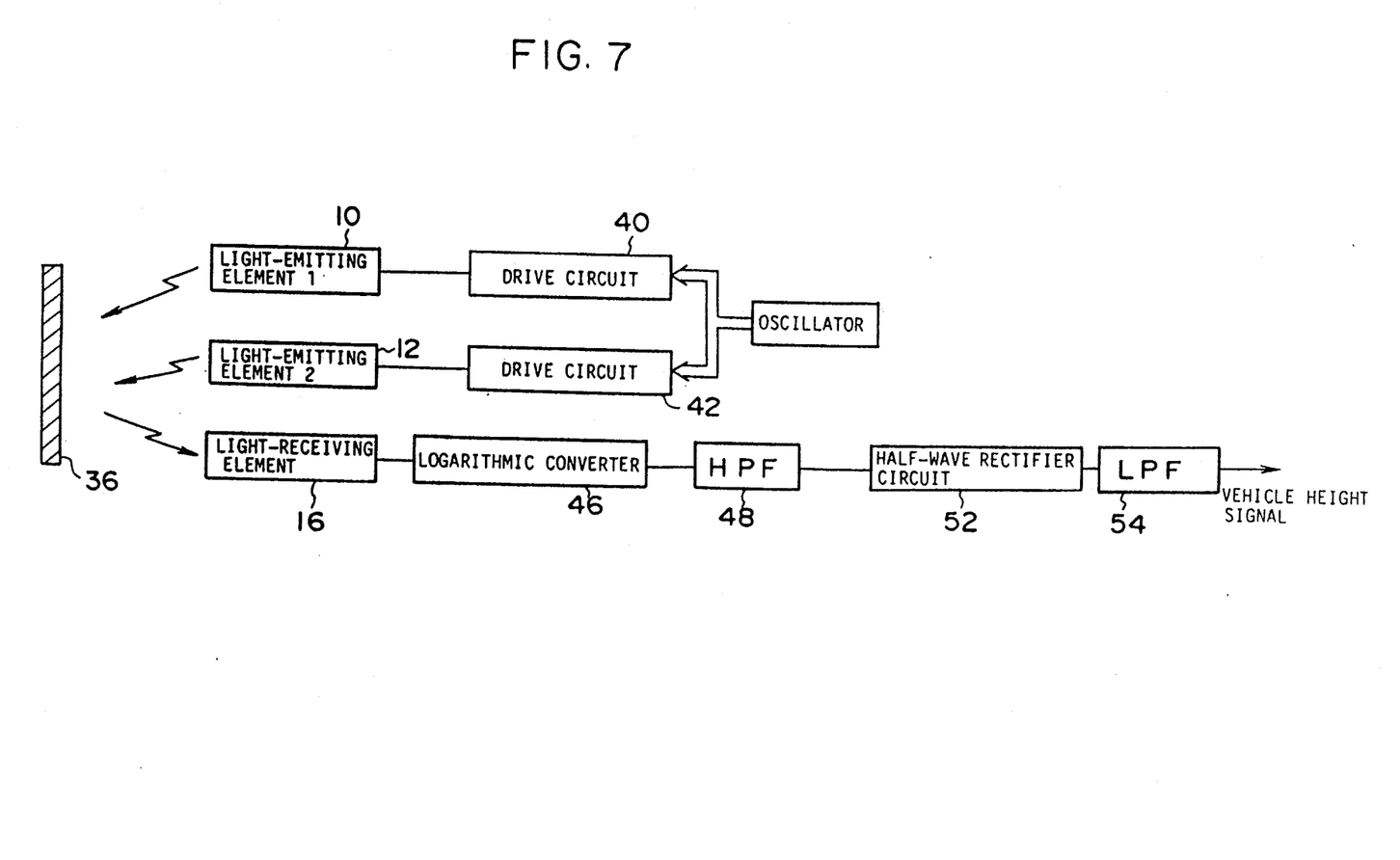
FIG. 7 is a block diagram showing a modified form of the first embodiment.

Next, a modified form of the first embodiment will now be described with reference to FIG. 7.

In this modification, a half-wave rectifier circuit 52 and a low-pass filter 54, which acts as a smoothing circuit are provided in place of the full-wave rectifier circuit 50. According to this modification, the output of the high-pass filter 48 is subjected, by the half-wave rectifier circuit 52, to rectification of the half waves and also is smoothed by the low pass filter 54, to obtain a similar vehicle-height signal to that obtained in the first embodiment.

Figure 8:
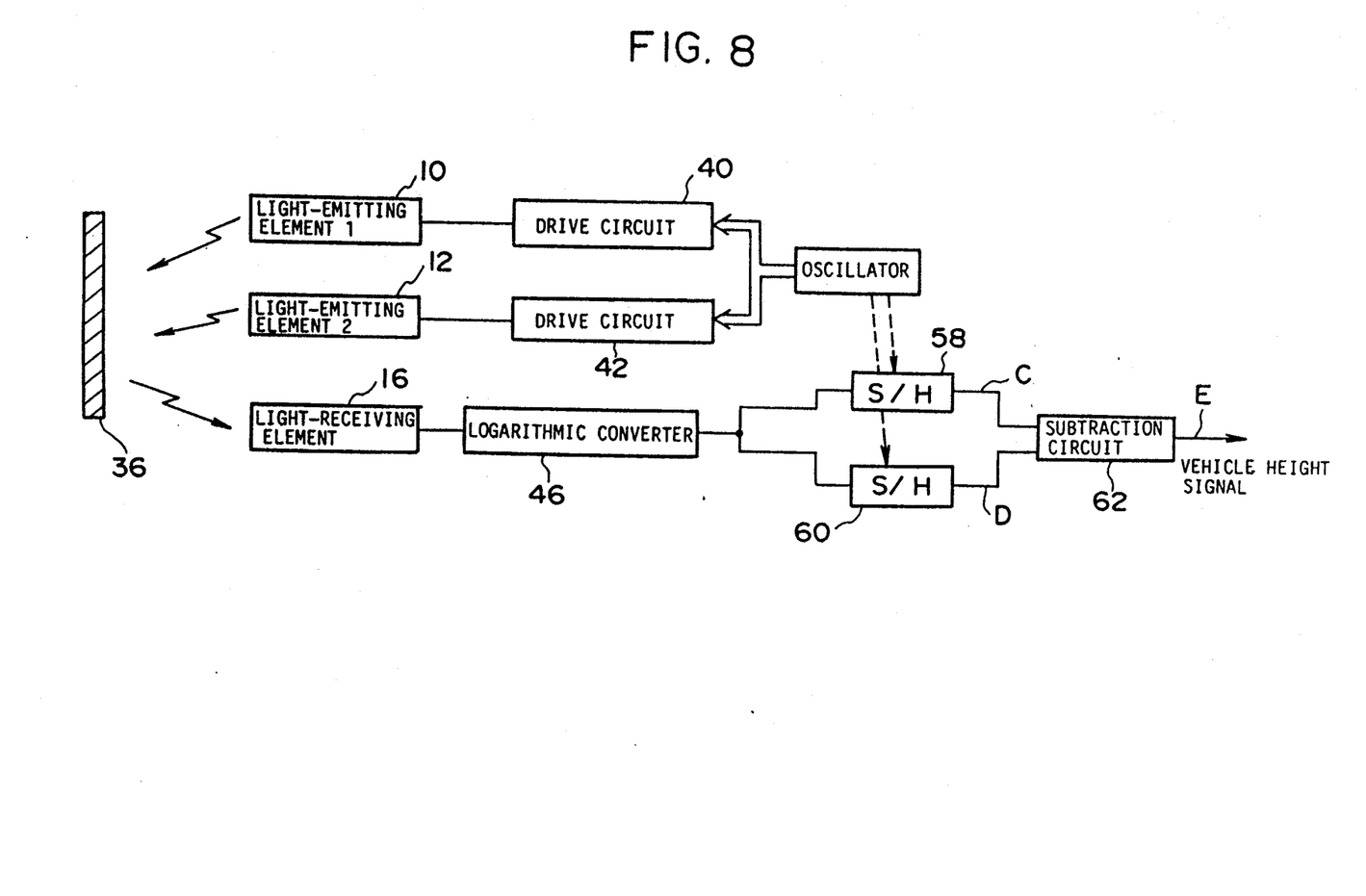
FIG. 8 is a block diagram showing a height sensor according to a second embodiment of the invention.

Next, a second embodiment of the present invention will be described with reference to FIG. 8.

This second embodiment is directed to an arrangement wherein a sample hold circuit and a subtraction circuit are used in place of the high-pass filter 48 and the full-wave rectifier circuit 50 in the first embodiment. The logarithmic converter 46 is connected to a first sample hold circuit 58 and a second sample hold circuit 60, which in turn are connected to a subtraction circuit 62. The oscillator 44 controls the first sample hold circuit 58 and the second sample hold circuit 60 to hold the signal in synchronous relation to its causing alternating emission of light rays from the first light-emitting element 10 and the second light-emitting element 12.

Figure 9:
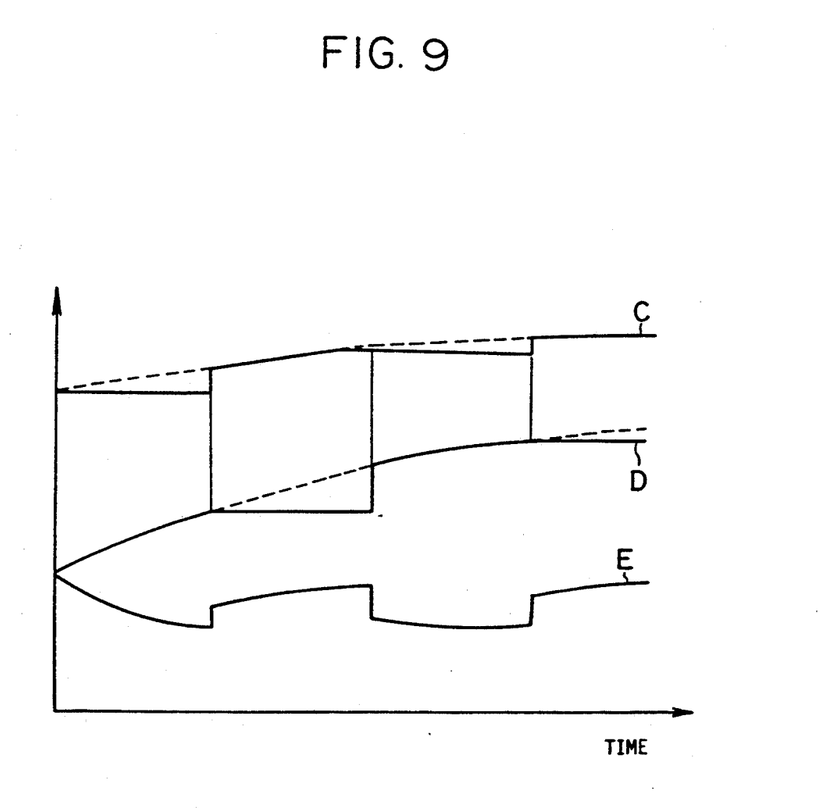
FIG. 9 is a linear diagram showing the waveforms involved in the portions shown in FIG. 8.

The operation of the present embodiment will now be explained. The oscillator 44 performs its control operation so that the signal outputted from the logarithmic converter 46 when causing the generation of a light ray from the first light-emitting element 10 and the signal outputted from the logarithmic converter 46 when causing the generation of a light ray from the second light-emitting element 12 may be held in the first sample hold circuit 58 and in the second sample hold circuit 60 cynchronously to its alternating generation of light rays from the first light-emitting element 10 and the second light-emitting element 12. The outputs of the first sample hold circuit 58 and the sample hold circuit 60 are as indicated by C and D in FIG. 9. The subtraction circuit 62 calculates the difference between the output of the first sample hold circuit 58 and the output of the second sample hold circuit 60 to output a signal E shown in FIG. 9. This signal E represents the vehicle height as in case of the first embodiment.

Although the above description is an example in which the height sensor is used as a vehicle-height sensor, the height sensor of the present invention can be utilized in the form of a back sensor or level sensor for a vehicle, or a position sensor for a machine tool, as well.

What is claimed is:

1. A height sensor comprising:
   a pair of light-emitting elements disposed at positions spaced at different distances from a surface desired to be measured and alternately giving forth light,
   a light-receiving element for receiving the light generated from said light-emitting elements and reflected by said surface desired to be measured, to produce a signal corresponding to the quantity of light received,
   a logarithmic converter circuit for logarithmically converting the signal outputted from said light-receiving element,
   a filter for removing direct current components of an output from said logarithmic converter circuit, and
   a rectifier circuit for rectifying an output of said filter.

2. A height sensor according to claim 1, wherein said filter removes the direct current components by removing the components of a frequency lower than the level of a light emission frequency of said light emitting element from the output of said logarithmic converter circuit.

3. A height sensor according to claim 1, wherein said rectifier circuit is a full-wave rectifier circuit.

4. A height sensor according to claim 1, wherein said rectifier circuit is a half-wave rectifier circuit and which is provided with a smoothin circuit for smoothing an output of said half-wave rectifier circuit.

5. An air cushion comprising:
   a reflection plate mounted to one of an upper-side spring member and a lower-side spring member,
   a pair of light-emitting elements mounted to the other of said upper-side spring member and said lower-side spring member at positions spaced at different distances from said reflection plate and alternately giving forth light rays,
   a light-receiving element mounted to the other of said upper-side spring member and said lower-side spring member for receiving light rays generated from said light-emitting elements and reflected by said reflection plate to produce a signal corresponding to the quantity of light received,
   a logarithmic converter circuit for logarithmically converting a signal outputted from said light-receiving element,
   a filter for removing direct current components of an output from said logarithmic converter circuit, and
   a rectifier circuit for rectifying an output from said filter.

6. An air cushion according to claim 5, wherein said filter removes the direct current components by removing the components of a frequency lower than the level of said light emission frequency of said light emitting element from the output of said logarithmic converter circuit.

7. An air cushion according to claim 5, wherein said rectifier circuit is a full-wave rectifier circuit.

8. An air cushion according to claim 5, wherein said rectifier circuit is a half-wave rectifier circuit and which is provided with a smoothing circuit for smoothing an output of said half-wave rectifier circuit.

9. A height sensor comprising:
   a pair of light-emitting elements disposed at positions spaced at different distances from a surface desired to be measured and alternately giving forth light rays, a light-receiving element for receiving the light rays generated from said light-emitting elements and reflected by said measured surface to produce a signal corresponding to the quantity of light received, a logarithmic converter circuit for logarithmically converting the signal outputted from said light-receiving signal, a pair of holding circuits for holding the outputs from said logarithmic converter circuit in corresponding relation to the light rays from said pair of light-emitting elements, and a subtraction circuit for calculating a difference between hold values which are held in said holding circuits.

10. An air cushion comprising:

a reflection plate mounted to one of an upper-side spring member and a lower-side spring member, a pair of light-emitting elements mounted to the other of said upper-side spring member and said lower-side spring member at positions spaced at different distances from said reflection plate and alternately giving forth light rays, a light-receiving element mounted to the other of said upper-side spring member and said lower-side spring member for receiving light rays generated from said light-emitting elements and reflected by said reflection plate to produce a signal corresponding to the quantity of light received, a logarithmic converter circuit for logarithmically converting the signal outputted from said light-receiving element, a pair of holding circuits for holding the outputs from said logarithmic converter circuit in corresponding relation to the light rays from said pair of light-emitting elements, and a subtraction circuit for calculating a difference between hold values which are held in said holding circuits.

* * * * *